(12) United States Patent
Zimmer et al.

(10) Patent No.: US 8,607,040 B2
(45) Date of Patent: Dec. 10, 2013

(54) METHOD OF PROVISIONING FIRMWARE IN AN OPERATING SYSTEM (OS) ABSENT SERVICES ENVIRONMENT

(75) Inventors: Vincent J. Zimmer, Federal Way, WA (US); Abdul M. Bailey, Tigard, OR (US); James W. Edwards, Portland, OR (US); Rahul Khanna, Portland, OR (US); Yu Fu Li, Shanghai (CN); Di Tang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 199 days.

(21) Appl. No.: 12/947,485

(22) Filed: Nov. 16, 2010

(65) Prior Publication Data

US 2012/0124357 A1    May 17, 2012

(51) Int. Cl.
   *G06F 9/00*     (2006.01)
   *G06F 15/177*   (2006.01)

(52) U.S. Cl.
   USPC ............................................................ 713/2

(58) Field of Classification Search
   USPC ............................................................ 713/2
   See application file for complete search history.

(56) References Cited

U.S. PATENT DOCUMENTS

| | | | |
|---|---|---|---|
| 2006/0107111 A1* | 5/2006 | Michaelis et al. | 714/15 |
| 2006/0136756 A1 | 6/2006 | Rothman et al. | |
| 2009/0132839 A1 | 5/2009 | Rothman et al. | |
| 2009/0150660 A1 | 6/2009 | Yao et al. | |
| 2011/0154065 A1* | 6/2011 | Rothman et al. | 713/300 |

FOREIGN PATENT DOCUMENTS

| WO | 2012/067882 A2 | 5/2012 |
|---|---|---|
| WO | 2012/067882 A3 | 7/2012 |

OTHER PUBLICATIONS

International Search Report and Written Opinion received for PCT Patent Application No. PCT/US2011/059615, mailed on May 18, 2012, 9 pages.
PCT International Preliminary Report on Patentability received for International Application No. PCT/US2011/059615, mailed May 30, 2013, 6 pages.

* cited by examiner

*Primary Examiner* — Mohammed Rehman
(74) *Attorney, Agent, or Firm* — Barnes & Thornburg LLP (57) ABSTRACT

Methods and apparatuses for re-instantiating a firmware environment that includes one or more firmware functions available at pre-boot time when transitioning the computing device from a first, higher power consumption state to a second, lower power consumption state. The firmware environment determines whether a cryptographic signature on a firmware volume is verified; whether hardware resources of the computing device requested by a manifest of the firmware volume are available; and whether a firmware module of the firmware volume is compatible with installed firmware of the firmware environment. If so, the firmware environment reserves space in a memory to accommodate resources used by the firmware module, and executes the firmware module with the computing device in the second, lower power consumption state.

20 Claims, 8 Drawing Sheets

METHOD OF PROVISIONING FIRMWARE IN AN OPERATING SYSTEM (OS) ABSENT SERVICES ENVIRONMENT

TECHNICAL FIELD

This disclosure relates generally to management of computing devices, and more specifically, to provisioning firmware in a firmware environment of a computing device, independent of an operating system of the computing device, while the computing device remains in a low power consumption state.

BACKGROUND

Various mechanisms exist for reducing power consumption of computing devices. Standard technology for power management is specified in Advanced Configuration and Power Interface (ACPI) version 4.0, which may be found on the public Internet at URL www-acpi-info (note that periods have been replaced with dashes to avoid unintentional hyperlinks in this document). ACPI is a standard that most computer systems currently use for power management and describes how a computing system looks to the operating system (OS). Power management capabilities enable a computing device, both at component and system level, to transition its operating state between a higher power consumption state and a lower power consumption state. These modes of operation are often respectively called wake and sleep states or modes. The ACPI Specification defines seven states which a computing device may typically be in. For example, state S3 ("S3"), may be typically referred to as standby, sleep (also referred to herein as "sleep mode"), or suspend to RAM. State S5 ("S5") may be referred to as shutdown or "off."

A number of events may cause a computing device to transition between sleep mode and wake mode i.e., wake up or go to sleep. For instance, a sleep event, which triggers a computing device to transition to sleep, might include user inactivity or user selection. When a computing device transitions to sleep, many of the computing device components (e.g., main processor such as central processing unit (CPU), volatile memory, disk drives for mass storage, and so forth) may also go to sleep. Once asleep, a computing device may wake upon occurrence of a wake event. A wake event may include, for example, a receiving by the computing device of input from a mouse or keyboard, an e-mail message, or a query from a remote system administrator.

After a wake event is handled, and before the OS runs again, there is an opportunity for the firmware of the computing device to perform useful work without OS involvement.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION

Illustrative embodiments of the present invention include, but are not limited to, methods and apparatuses for provisioning firmware modules in a firmware environment of a computing device, independent of the operating system of the computing device, when the computing device remains in a low power consumption sleep mode.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. The phrase "in one embodiment" is used repeatedly. The phrase generally does not refer to the same embodiment; however, it may. The terms "comprising," "having," and "including" are synonymous, unless the context dictates otherwise.

Figure 1:
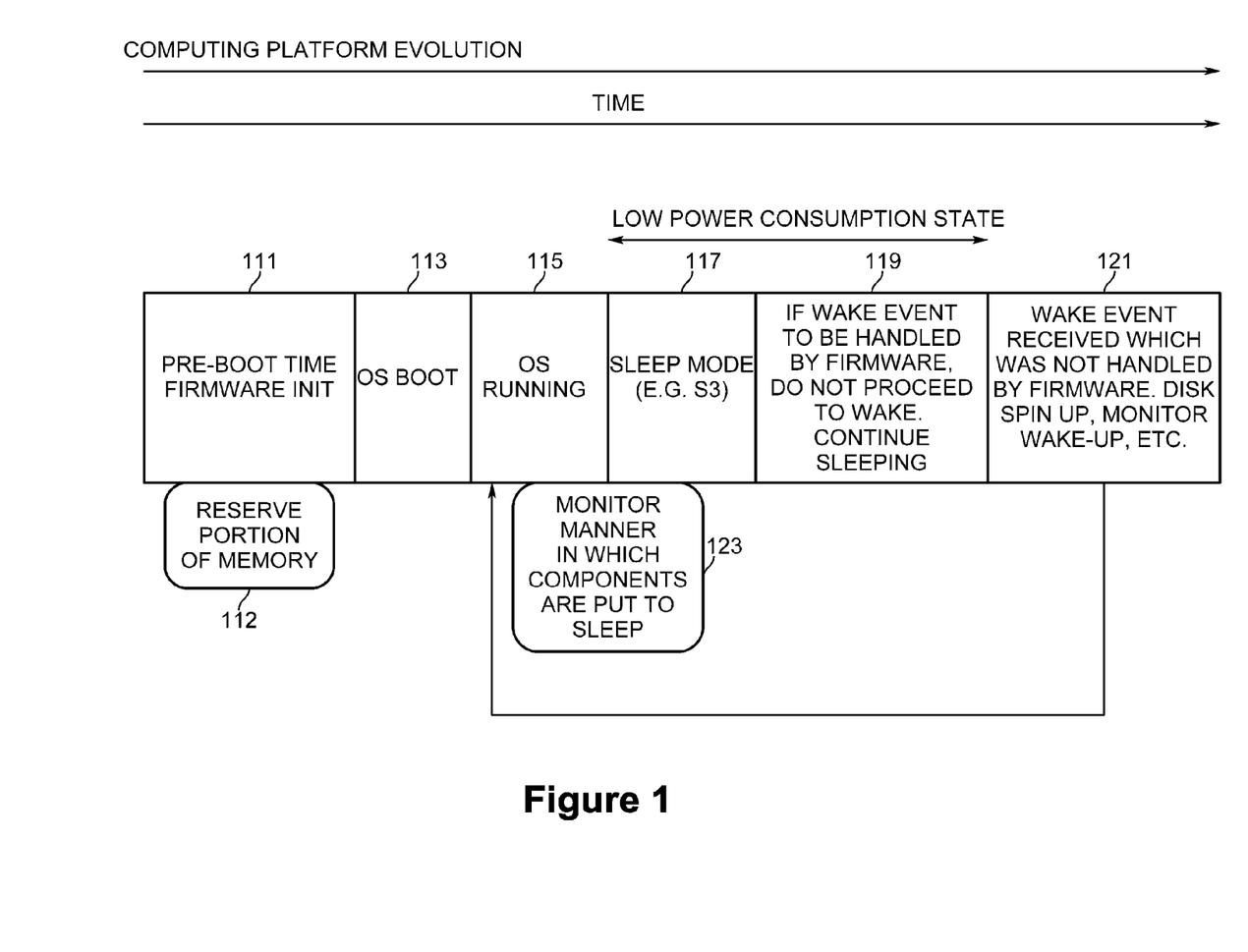
FIG. 1 is a timeline illustrating a transition of a computing device from a wake mode to a sleep mode, according to various embodiments.

FIG. 1 is a timeline illustrating a transition of a computing device from a wake mode to a sleep mode, in accordance with various embodiments. As described herein, in various embodiments, the firmware of a computing device may be enabled to accomplish work while the computing device is in sleep mode. The firmware can accomplish this work independently of the operating system, which results in increased functionality as well as reduced overall power consumption for the computing device. In embodiments, the computing device or system may be a desktop computer, laptop computer, mobile computing device, network server, thin client, or other computing device configured to utilize firmware. In embodiments, the firmware may be legacy basic input/output system (BIOS), Unified Extensible Firmware Interface (e.g. UEFI Specification Version 2.0, 2006) compatible, Extensible Firmware Interface (EFI) compatible (e.g., EFI Specification Version 1.10, 2004) or other firmware. Note that EFI is a public industry specification that describes an abstract programmatic interface between computing device firmware and operating system or other application environments. For example, EFI enables firmware, in the form of firmware modules, to be loaded from a variety of different resources, including flash memory devices, option ROMs (Read-Only Memory), various persistent storage devices (e.g., hard disks, CD-ROM (Compact Disk-Read Only Memory), etc.), or from one or more computer systems over a computer network. More information about the Unified EFI (UEFI) architecture may be found on the public Internet at www-uefi-org (note that periods have been replaced with dashes to avoid unintentional hyperlinks in this document). Thus, as described herein, in various embodiments, upon the transition to a sleep mode, a computing device may re-instantiate a UEFI or other firmware environment that includes one or more firmware functions available at pre-boot time. In embodiments, the re-instantiated firmware environment may enable the firmware environment to perform power management functions normally performed by the OS of the computing device. In an embodiment, the re-instantiated firmware environment may provide for the provisioning of new firmware modules or updating of existing firmware modules without the involvement of the OS. In an embodiment, the newly installed or newly updated firmware modules may be executed to perform operations for the computing device.

Referring now to FIG. 1, in the embodiments shown, a computing device may be initialized during a pre-boot time by a firmware environment (also referred to as firmware), at 111. In various embodiments and as will be discussed in more detail below, during this pre-boot time, the firmware may reserve a portion of memory or mailbox from which the firmware may later collect data at 112. Once pre-boot initialization is complete, control may be transferred to an operating system (OS) of the computing device to continue the boot process at 113. After OS or system boot, the OS may then run or operate the computing device in a functional or wake mode at 115, which includes a typically higher power consumption state associated with normal operations. The computing device may continue to operate in wake mode until 117, where a sleep event causes the computing device to transition to sleep mode S3, which includes a lower power consumption state. As noted above, sleep events may include a variety of events, such as for example, user selection or user inactivity.

After some time, in various embodiments, the computing device may receive a wake event. In some embodiments, the wake event may include a network event such as an e-mail, configuration directive, or other network transmission. In other embodiments, the wake event may be a sensing of an input at an input device, touching a keyboard of the computing device, receiving a network packet of a certain type, etc. Processing of wake events may be initiated by system management interrupts (SMIs), control line changes, register flags, or other constructs. In other cases, processing of wake events may be initiated by a chipset of the computing device. Furthermore, some wake events may trigger a powering up of the computing device for processing by the OS. Other wake events, as will be discussed below in relation to embodiments of the present disclosure, may be processed by the firmware while the computing device remains in sleep mode.

Accordingly, in various embodiments, the firmware, acting independently of the OS of the computing device, may determine whether the wake event can be handled without returning the entire computing device to the first higher power consumption state. If the wake event cannot be handled by the firmware and the OS is to handle the wake event, then disks may be spun up, the monitor may be turned on, and the computing device may be restored to full wake mode at 121. The process flow may then return to 115, where the OS runs or operates the computing device in wake mode. If, however, the firmware determines that the wake event can be handled independent of the OS and without returning the entire computing device to the first higher power consumption state, the firmware can cause the wake event to be handled. The computing device may thus continue to sleep at 119. In some embodiments, dependent on the wake event and without waking the entire computing device, the firmware may wake one or more hardware components or devices to service or complete a task associated with the wake event. Additionally, after completion of handling of the event, the firmware may return the hardware component to sleep mode which includes the second lower power consumption state.

Note that in the embodiments, at 123, a firmware component, such as for example, a filter driver, may begin to monitor and collect data related to a manner in which the OS transitions the one or more hardware components to sleep mode. In various embodiments, the filter driver may save the collected data to the mailbox or portion of memory that was reserved by the firmware during a pre-boot time at 112. The firmware may independently later use the collected data to transition the one or more hardware components needed to service the wake event to and or from sleep mode. In an embodiment, a wake event may result in executing a firmware module provisioned to the computing device after shipment to the end user.

Figure 2A:
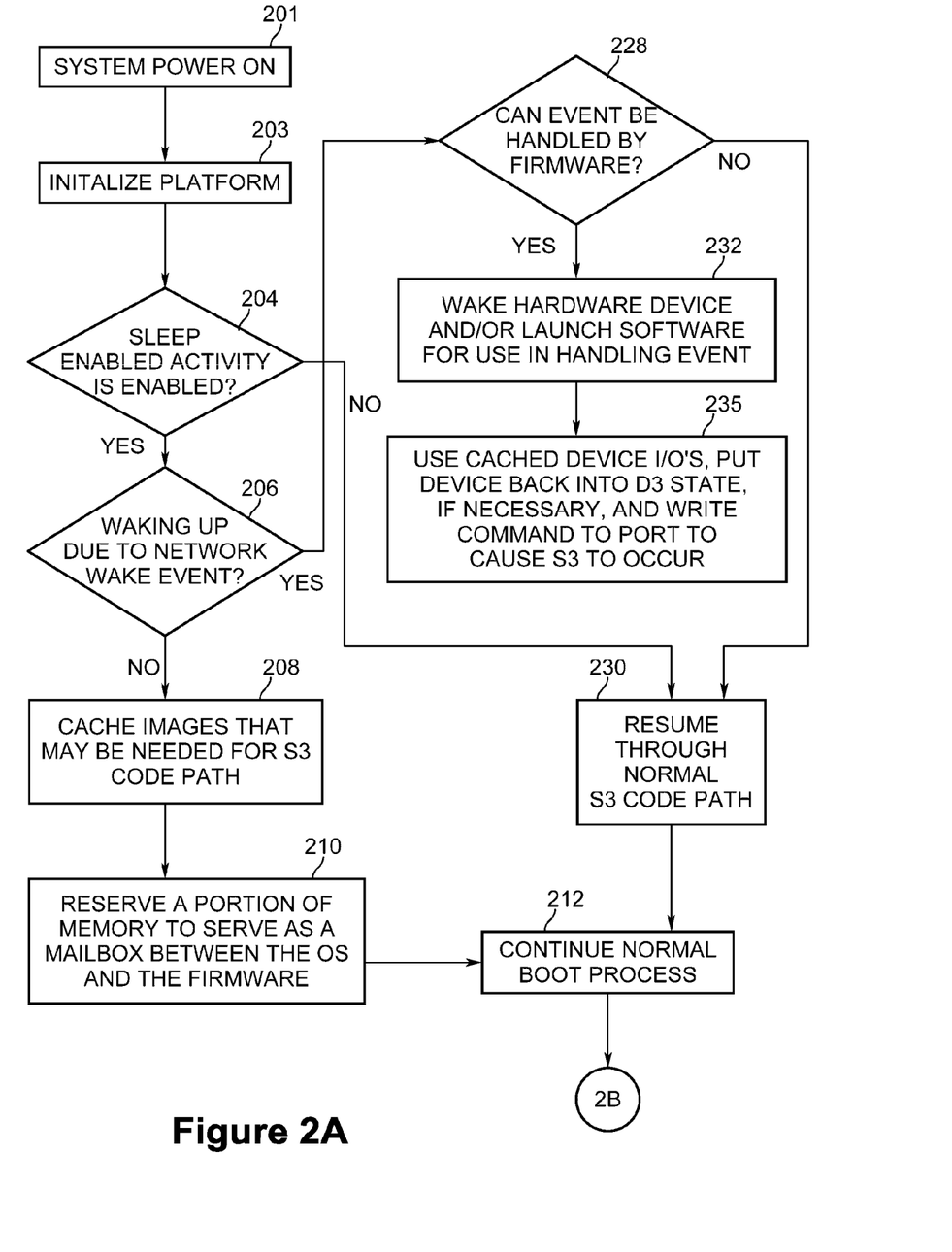
FIG. 2 is a flow diagram illustrating an exemplary method for handling by a firmware a wake event independent of an operating system (OS), according to various embodiments.
Figure 2B:
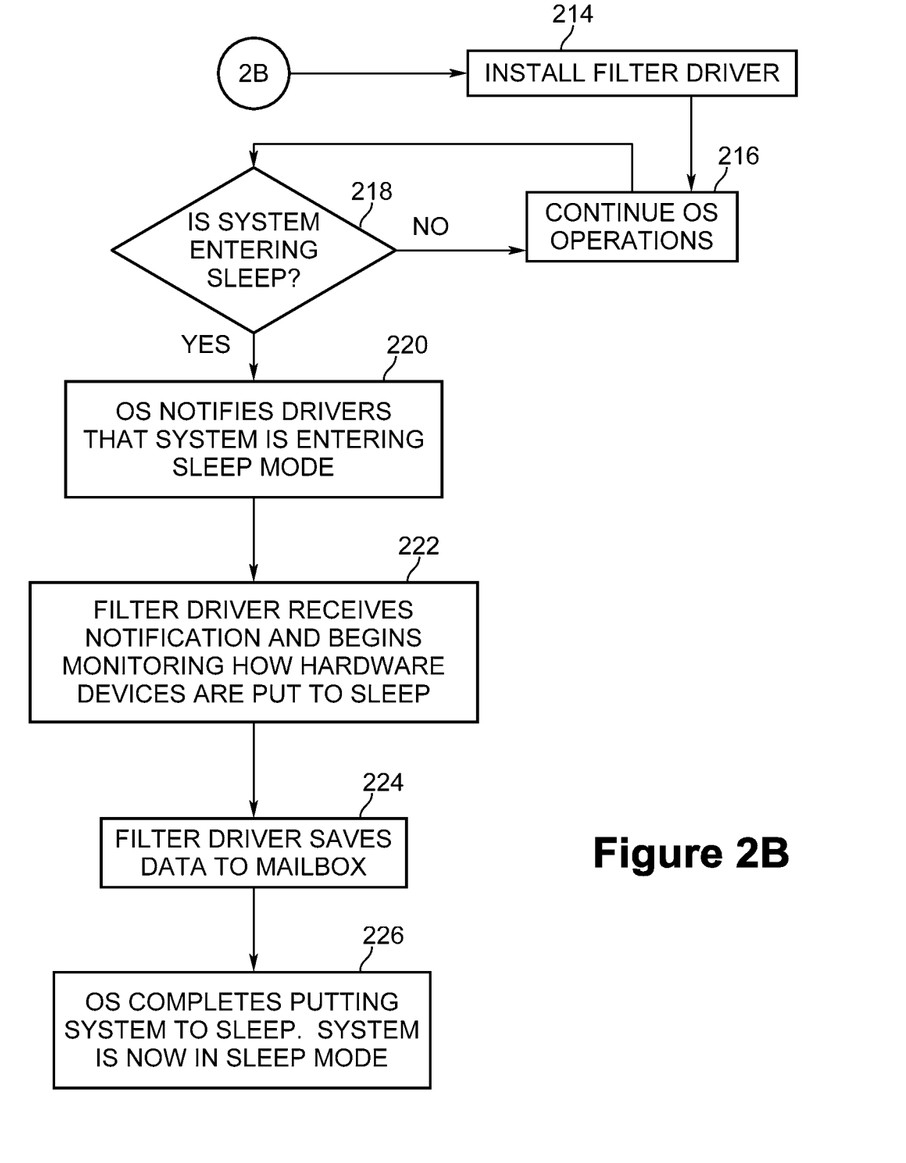

Next, FIGS. 2A and 2B are flow diagrams illustrating an exemplary method for handling wake events independently of the OS, according to various embodiments of the disclosure. Blocks shown in FIG. 2A, in an embodiment, may be performed by the firmware. Blocks shown in FIG. 2B, in an embodiment, be performed by the OS. It will be apparent to one of ordinary skill in the art that the term "performed by the firmware" is shorthand for a more complex computing device interaction. In a single processor system, for instance, instruction execution may be performed by a main processor, or central processing unit (CPU). Note that "Performed by the firmware" may mean that non-operating system instructions are fetched from a non-volatile memory store (firmware), coupled to the processor and then executed by the processor. The processor has access to the firmware prior to loading the OS. Thus, boot instructions may be typically stored in a firmware boot block. Furthermore, in some embodiments, the full boot block may reside remotely, and the local boot block may contain a pointer to the remote location of the full boot block.

In the embodiments of FIG. 2, a computing device or system may be powered on at block 201. The computing platform may be preliminarily initialized by the boot block firmware in block 203. Other portions of the firmware, residing outside of the boot block, may play a role in the preliminary initialization. Note that the boot block is typically responsible for early aspects of initialization such as early memory initialization and central processor initialization. Preliminary initialization may also include identifying and resetting memory, identifying devices and components coupled to the computing device, etc.

In the embodiments shown, as a part of preliminary initialization or soon afterwards, the firmware may initiate a number of policy questions to determine a status of the computing device. At block 204, the firmware may determine if sleep-enabled activity is enabled. If so, processing continues with block 206. If not, processing continues with block 230. In the embodiments, the firmware may ask at block 206, whether the computing device is waking up or transitioning out of sleep mode, due to a wake event (e.g., a network wake event in at least one embodiment). In various embodiments, where the computing device is not waking up due to a network wake event, but has simply completed powering up, the pre-boot process may continue to a block 208. At block 208, the firmware may proceed to cache images that may be needed at a later time. For example, it may cache data needed for a sleep mode (e.g. S3). Next, at a block 210, the firmware may reserve, during this pre-boot time, a portion of memory in a tangible computer readable storage medium of the computing device. In an embodiment, the portion of memory may serve as a mailbox of the firmware. Note that typically, computing device resources are under control of the OS unless the firmware actively reserves such resources for itself. Furthermore, in various embodiments, to be discussed below, input/output (I/O) data related to a manner in which the OS may transition one or more hardware components to sleep may be saved (e.g. by a monitoring component of the OS) into the mailbox to be accessed at a later time by the firmware. In the embodiments, enough memory may also be reserved that may allow the firmware to reinitialize previously cached images.

In the embodiments shown, at a next block 212, the firmware may continue a normal boot process and the OS may be given control and launched. At block 214 on FIG. 2B, the OS may install a component, such as, for example, a filter driver. As will be seen below, the filter driver may serve as the monitoring component to collect I/O data related to transition of the hardware components to sleep mode. Normal OS operations may continue at a block 216. At a decision block 218, if input has not been received for a certain period of time or other computing device policy dictates, the OS may transition the computing device to sleep mode. If, for example the policy does not dictate that the computing device transition to sleep mode, OS operations may continue at a block 216. In the alternative, returning to decision block 218, if the computing device is to enter sleep mode, the OS may continue downward from decision block 218 to block 220. In the embodiment, the OS may then send a message notifying all or substantially all hardware component or hardware device drivers that the hardware components are to transition to sleep mode. The filter driver may receive or detect this notification at block 222 and begin monitoring input/output (I/O) data related to a manner in which the one or more hardware devices or components are transitioned to sleep mode, e.g. I/O signals between a hardware device interface and the hardware device driver. At a block 224, the filter driver then may collect the I/O data and save it to the mailbox which was reserved by the firmware environment at a pre-boot time (described at block 210). Finally, at a block 226, the OS has completed transitioning the computing device to sleep mode.

Note that the I/O data saved to the mailbox at block 224, as alluded to earlier, may be used at a later time to enable the firmware to use the I/O data during and/or after the handling of a wake event. Thus, for example, returning up to decision block 206, if the computing device is waking up due to a wake event e.g. network wake event, the YES arrow may be followed. At block 228, the firmware may determine, while the OS remains in sleep mode, whether the network event can be handled by the firmware, independent of the OS and without waking or returning the entire computing device to a higher power consumption state. If the answer is NO, the computing device resumes through the normal S3 codepath at block 230 and eventually continues the normal boot process at 212. If the answer is YES, however, the firmware may cause the network event to be handled independently of the OS. In some embodiments, at a block 232, the firmware may wake or transition only one or more (but not all) hardware components to a higher consumption state and/or launch software for use in handling the network event. At a block 235, the firmware may use cached device I/Os to put the computing device back into a D3 state, and if necessary, write a command to the appropriate port to cause a transition to S3 to occur.

Thus, in various embodiments, a firmware environment of a computing device is re-instantiated once a computing device transitions to sleep mode. In embodiments, the firmware environment is enabled to perform power management or other functions normally performed by the OS of the computing device. In some embodiments, not only does the computing device have an ability to transition certain hardware components to sleep, e.g., those associated with a network transmission received by the computing device during sleep mode, the firmware environment is able to initiate a transition to wake mode a plurality of additional hardware or other components of the computing device. In various embodiments, the firmware environment is enabled to retrieve I/O data related to a manner in which any of a plurality of hardware devices is transitioned to sleep mode. Such I/O data may be retrieved from a mailbox that was reserved by the firmware during a pre-boot time. In various embodiments, the firmware environment is enabled to transition the hardware components to sleep mode, a power management function typically only performed by the OS. In various embodiments, the firmware environment is enabled to provision new or updated firmware modules.

Figure 3:
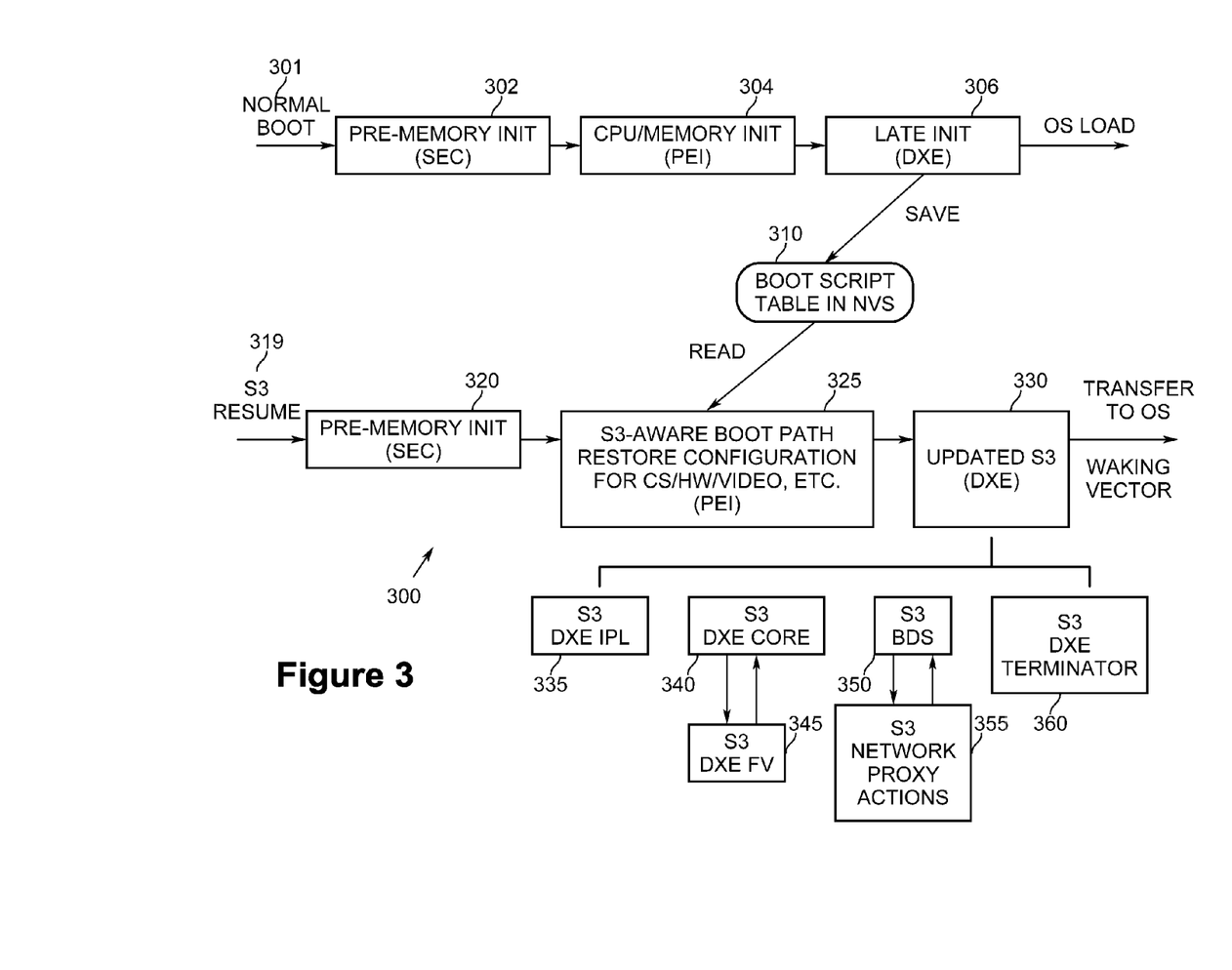
FIG. 3 is a block diagram illustrating a boot and wake cycle in a computing device, according to various embodiments.

Referring now to FIG. 3, embodiments may conjoin a module S3 resume architecture of, for instance, the Platform Innovation Framework for the Extensible Firmware Interface (EFI)—Draft for Review, Version 0.9, Sep. 16, 2003, available at www-intel-com/technology/framework (note that periods have been replaced with dashes to avoid unintentional hyperlinks). Typically, for example, according to a UEFI Platform Initialization (PI) Specification, version 2.3, published May 8, 2009, a full complement of PI pre-EFI (PEI) modules and PI Driver Execution Environment (DXE) drivers may be invoked during boot from an S5 mode ("off"). As a result, a UEFI environment that may be used by pre-OS applications, e.g. UEFI shell, 3rd party UEFI drivers/option ROM's, and UEFI OS loaders, is created. During S3, however, because of S3 resume time constraints, the computing device may run a standard PI resume flow that may typically include only a subset of PEI without DXE. As such, during an S3 resume mode, rich UEFI driver features may not be available. However, various embodiments of the disclosure provide that a computing device may implement DXE 330 during S3. Thus, as shown in FIG. 3, S3 may include DXE to recreate a UEFI environment in some pre-OS sequestered (or OS driver pinned) pages for running UEFI boot service applications while the OS is in sleep mode.

Referring now to FIG. 3, shown in the embodiments, a block diagram 300 illustrates a boot and wake cycle, implemented according to a UEFI architecture. In the embodiment, during a normal boot 301 after a power-on or reset, a pre-memory init security (SEC) phase 302 ("SEC 302") may begin. SEC 302 may support security checks of an initial operating code to be executed on a computing device. Next, in the embodiment, SEC 302 may transition to a CPU/memory init, pre-EFI (PEI) phase 304 ("PEI 304"). PEI 304 may provide, for example, a method of loading and invoking specific initial (INIT) configuration routines for a processor, chipset, and motherboard. PEI 304 may discover memory and prepare a resource map that may be handed off to a late init, driver execution environment (DXE) phase 306 ("DXE 306"). DXE 306 may include the invoking of DXE drivers responsible for initializing the processor, chipset, and platform components, as well as providing software abstractions for console and boot devices. As shown at 310, DXE 306 may save I/O controller settings as part of a boot script table in a reserved memory such as a non-volatile store (NVS). A boot script may include a set of actions to be replayed upon an S3 restart to bring the computing device back to a state it was in before transitioning into sleep mode. A typical boot script will restore I/O device and CPU state information.

As seen at 319, in an S3 resume boot, SEC 320 may be implemented. Next, at 325, S3 PEI modules may restore PEI phase configurations from the NVS in 310, e.g. basic restoring of chipset (CS), hardware (HW), and video settings. Thus, in embodiments, updated DXE 330 may be implemented during S3, while the OS is sleeping. DXE 330 may be facilitated by several components or phases, including a S3 DXE initial program load (IPL) 335, S3 DXE core 340, S3 DXE Firmware Volume (FV) 345, S3 Boot Device Selection (BDS) 350, S3 Network Proxy Actions 355, and S3 DXE Terminator 360. As noted above, an instantiation of a substantially fully formed UEFI interface may be implemented as a result of including DXE 330 in S3. Typically, only a smaller number of UEFI drivers are added during a pre-boot phase. In an embodiment, however, an OS driver may add additional UEFI drivers into the UEFI environment. In various embodiments, UEFI drivers may be collected from alternate sources. In some embodiments, these additional drivers may be provisioned on a UEFI system partition or via other methods to enhance the number of UEFI drivers available during DXE 330.

Figure 4:
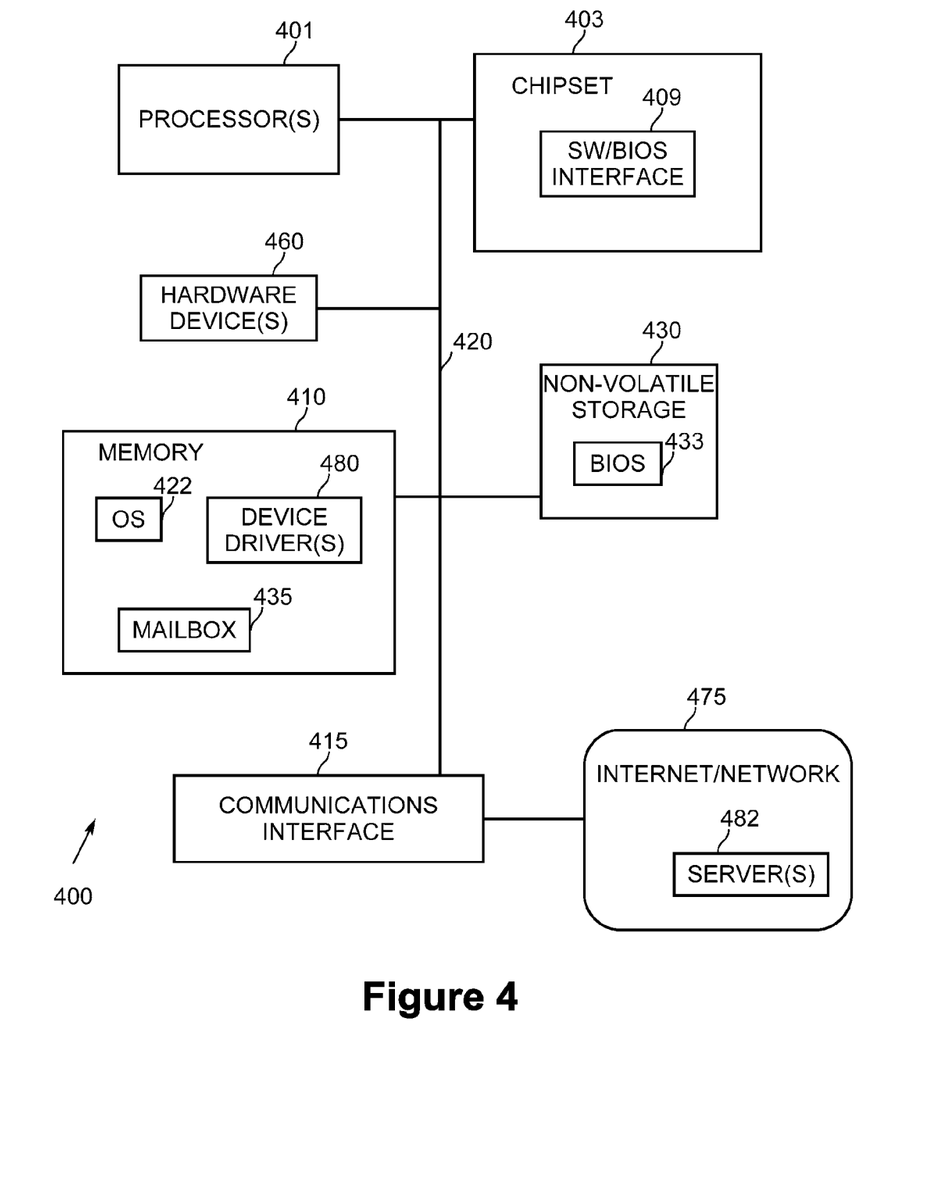
FIG. 4 is a block diagram illustrating an exemplary computing device, according to various embodiments.

FIG. 4 illustrates an exemplary computing device 400 in which an embodiment of the present disclosure may reside. In various embodiments, a computing device 400 comprises various elements coupled via a bus 420. As shown, the elements may include a processor 401, memory 410, a chipset 403, hardware device(s) 460, a non-volatile storage 430, such as flash memory, and communications interface 415. Chipset 403 may be endowed with the earlier described firmware. Memory 410 may include OS 422, earlier described mailbox 435, and device driver(s) 480. Processor 401 may be any type of processor capable of executing software, such as a microprocessor, digital signal processor, microcontroller, or the like. Though FIG. 4 shows only one such processor 401, there may be one or more processors in computing device 400 and one or more of the processors may include multiple threads, multiple cores or the like. In various embodiments, a firmware module of the BIOS 433 may determine or collect information related to a transition of one or more hardware devices 460 between a first higher power consumption state and a second lower power consumption state by monitoring I/O signals on bus 420 communicated between a hardware interface of one or more hardware devices 460 and device driver(s) 480. While in sleep mode, the firmware may handle one or more network or wake events as earlier described.

The communications interface 415 may include a networking interface such as a network interface card (NIC) or the like. The NIC may be communicatively coupled to an Internet/Network 475 including a remote server or server(s) 482 via, e.g., a serial over local area network (LAN) interface. The communication interface may support Transfer Control Protocol/Internet Protocol (TCP/IP), hypertext transfer protocol (HTTP) or Simple Object Access Protocol (SOAP), or other communication protocol. The NIC may use other means to communicate over a network, for instance, Integrated Drive Electronics (IDE) redirection (not shown) or other means. Note that in embodiments, handling a wake event may include but is not limited to responding to particular packet types, keeping dynamic host configuration protocol (DHCP) leases alive, low power background activities, such as for example, scanning memories for viruses, and remote file backups/restores, and the like. In the embodiment shown, the chipset 403 may also include a software interface for a basic input output system (BIOS) 409.

Figure 5:
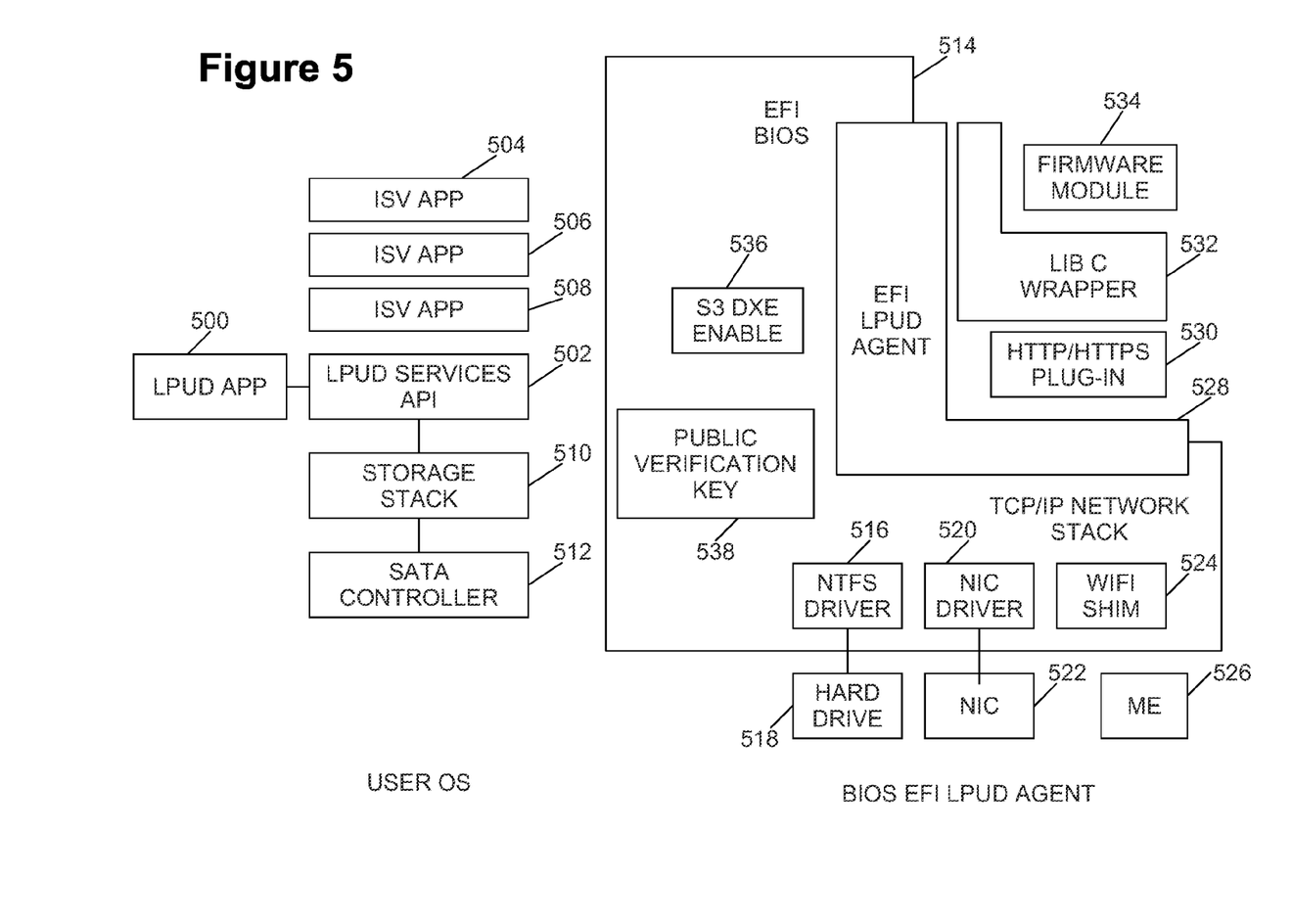
FIG. 5 is a diagram of a software stack over hardware components according to various embodiments.

FIG. 5 is a diagram of a software stack over hardware components according to various embodiments. In an embodiment, in a user OS visible environment, a low power update/download (LPUD) application 500 and associated LPUD services application programming interface (API) 502 may be interposed between independent software vendor (ISV) application programs 504, 506, 508, and a storage software stack 510 which communicates with a serial advanced transport architecture (SATA) controller 512. The SATA controller communicates with storage devices (not shown in FIG. 5). The LPUD app performs various activities in an OS-absent state; these can include a scan of the disk for virus signatures (e.g., anti-virus client), a remote back-up of the disk contents to a computing cloud backup server (e.g., backup client), or acting as a file server (e.g., serving MP3s or MP4s to an In-Vehicle Infotainment PC while the laptop's main OS is suspended and the laptop is in the LPUD state). The LPUD services API provides access to the disk in a fashion that is non-destructive to the file-system, such as read operations, so that when the main OS wakes up, it doesn't find the disk in a corrupted state. The LPUD service API also provides for a Socket Library to perform send and receive operations in order to support the backup (e.g., send of data from client) and anti-virus (AV) scan (e.g., receive of signature files). The User OS side may receive status information from the LPUD once the main OS wakes up, or the User OS may initiate a transfer to the LPUD state when the User OS is not busy. Also, the User OS will provide the console for in-band activation of the LPUD application, including but not limited to, opting-in, and deciding how much memory to sequester for LPUD (since this physical memory will be lost to the User OS and may have a performance impact).

In an embodiment, in a firmware environment, EFI BIOS 514 (stored in NVS 430 as BIOS 433 in FIG. 4) includes at least several components. New Technology File System (NTFS) driver 516 communicates with hard drive 518 to read and write data. Network interface controller (NIC) driver 520 communicates with NIC 522 to read and write data over a network coupled to the computing device. WiFi shim 524 provides for the UEFI UNDI interface, as defined in Appendix E.2 of the UEFI 2.3 specification, Command and Data Blocks (CDBs), that provide raw data gram reads and writes to the Wireless Nic (W-NIC) in the computing platform; this can include a third party W-NIC or a management engine (ME) based W-NIC where the UNDI CDBs are proxied through the Host Extended Command Interface (HECI) of a chipset commercially available from Intel Corporation. Manageability Engine (ME) 526 may be included to provide an out-of-band chipset network-facing management capability. EFI LPUD agent 528 coordinates the provisioning of new firmware modules and/or updating existing firmware modules while the computing device is in a sleep state. Hyper text transport protocol (HTTP)/HTTP secure (HTTPS) plug-in 530 may be included to leverage the LibSocket and Lib C wrapper 532 may be included to abstract POSIX-like programming APIs. Firmware module 534 comprises a new or updated firmware module that may be obtained from an ISV and installed into the computing device as disclosed herein. In an embodiment, EFI BIOS 514 also includes S3 DXE Enable flag 536 and public verification key 538 (called Kpub_s3extension_verification in one embodiment).

In an embodiment, the computing device has the EFI BIOS firmware and at least one S3 DX IPL firmware module installed on the system board during the manufacturing process at the factory. The S3 DXE Enable flag 536 in the EFI BIOS may be set to false at manufacturing time. The computing device may then be shipped to a user. While being operated by the user, the computing device may be booted into the OS via the S4 state (hibernate) or the S5 state (full power cycle). The user, via the OS and a conventional web browser, may visit a selected website to download a S3 DXE firmware volume.

Figure 6:
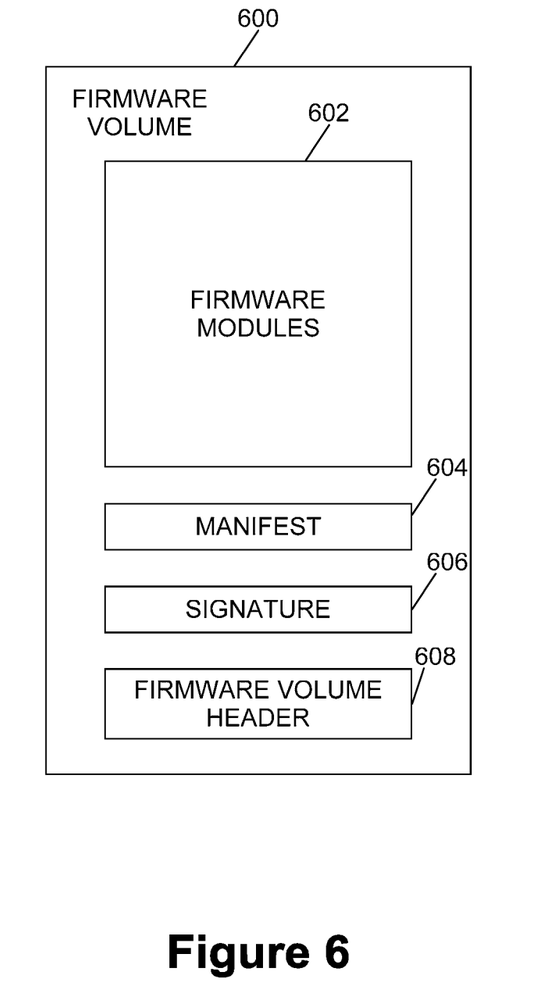
FIG. 6 is a diagram of a firmware volume according to an embodiment of the present invention.

FIG. 6 is a diagram of a S3 DXE firmware volume 600 according to an embodiment of the present invention. Firmware volume 600 comprises a binary file having a firmware volume header 608 and a cryptographic signature 606 that covers the contents of the firmware volume. Firmware volume 600 further comprises one or more firmware modules 602. In an embodiment, the firmware modules have the ".efi" file extension. In an embodiment, firmware modules comprise drivers. Firmware modules 602 comprise firmware binary code for one or more S3 DXE IPL firmware modules. In embodiments of the present invention, the firmware modules may be read from the firmware volume, installed in non-volatile storage 430, and executed during a low power consumption state as described further herein. Firmware volume further comprises manifest 604. Manifest 604 declares what computing device hardware resources (I/O devices, memory, etc.) that the S3 DXE firmware volume will consume or use when executed. The S3 DXE firmware volume was previously signed by a third party (such as an independent software vendor (ISV), original equipment manufacturer (OEM), or independent BIOS vendor (IBV) using a signing server that has an associated private key (Kpriv_s3extension_verification).

An OS-present application program may then prompt the user to inquire whether the user wishes to install the S3 DXE extension firmware module(s). If the user does want to install the firmware module, in an embodiment the OS-present application invokes the UpdateCapsule UEFI runtime service with a pointer to the S3 DXE firmware volume stored in non-volatile storage. Upon restart (either a warm start or the S3 state, depending on how the EFI BIOS firmware implements the UpdateCapsule runtime service, which should be opaque to the user), the EFI BIOS firmware detects the presence of the S3 DXE firmware volume in non-volatile storage.

Figure 7:
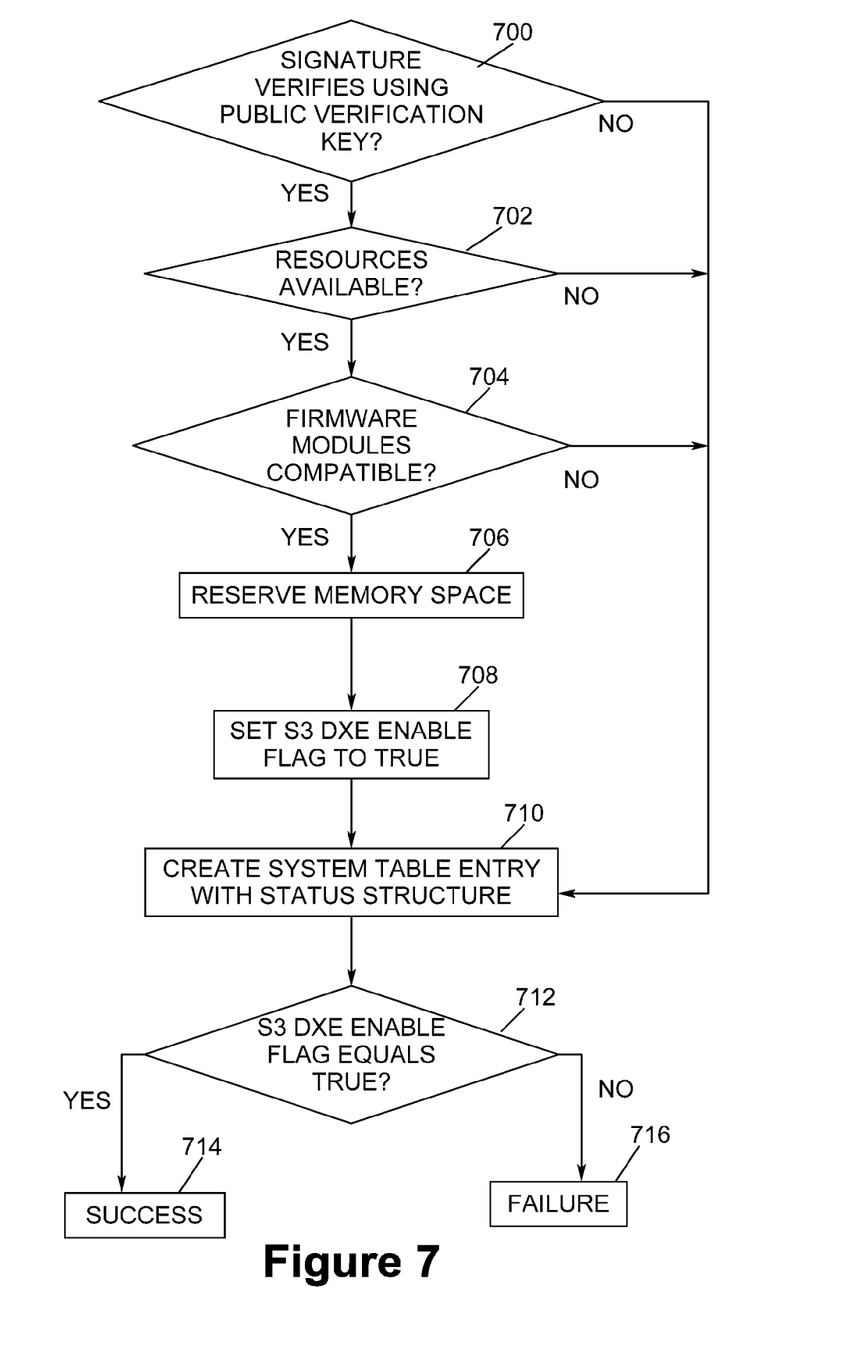
FIG. 7 is a flow diagram of a provisioning process according to various embodiments.

FIG. 7 is a flow diagram of a provisioning process according to various embodiments. In an embodiment, this processing may be performed while the computing device is in a S3 sleep state as shown in FIG. 3. At block 700, the EFI BIOS firmware determines whether the cryptographic signature 606 on the S3 DXE firmware volume verifies using the public verification key (Kpub_s3extension_verification). If so, at block 702 the EFI BIOS firmware checks to determine if the hardware resources requested by firmware volume manifest are available. If so, at block 704, the EFI BIOS determines if the firmware modules in the firmware volume are compatible with the existing firmware already installed (e.g., have their dependencies been satisfied, is the correct instruction set architecture present, etc.). If so, at block 706, the EFI BIOS reserves a memory space in non-volatile memory large enough to support the resources to be used by the new or updated firmware modules from the firmware volume. At block 708, the EFI BIOS sets the S3 DXE Enable flag to true. If at blocks 700, 702, and 704, any checks fail, processing continues at block 710. At block 710, the EFI BIOS creates a system table entry. The system table has a EFI Configuration Table, as described in section 4.6 of the UEFI 2.3 specification. It allows for installing a series of additional tables named by a Vendor GUID. The EFI BIOS in this case would create such a table that has a BOOLEAN value which is "TRUE" for success and "FALSE" for failure. The system table entry comprises a status structure for returning a status value relating to execution of the firmware module to the OS in response to the UpdateCapsule runtime service call. This is done after leaving S3 and waking up the system, in order to pass status information from the embedded S3 processing environment back into the main host OS. At block 712, if the S3 DXE Enable flag is true, a success status may be returned at block 714, and the firmware module may be executed. Otherwise, a failure status may be returned at block 716.

In an embodiment, an alternate way to supply memory for the hardware resources used is for the OS to "pin" or reserve the OS pages that the S3 DXE firmware module will use and pass the (possibly scattered) page list into the UpdateCapsule runtime service call. Thus, the firmware does not steal memory from the OS memory map, but instead will take the scattered page list from the OS and make these pages "firmware reserved" thereafter and use them for launching the S3 DXE firmware modules.

In an embodiment, the OS installer can put the S3 DXE firmware volume in a directory on a UEFI service partition and pass the location of the firmware volume via the UpdateCapsule call. In another embodiment, the EFI BIOS may probe the UEFI system partition for the firmware volume. In either case, the EFI BIOS cryptographically verifies the contents of the firmware volume prior to copying the content into memory used in successive S3 DXE activations.

In an embodiment, upon a successive S3 resume, if the S3 DXE Enable flag is true, then the EFI BIOS may launch the S3 DXE IPL and the associated firmware modules from the S3 DXE firmware volume prior to going back to sleep and/or passing control to the OS resume vector.

Thus, a one touch provisioning model where an OS-hosted installer can activate a firmware module download capability in a lower power consumption state has been described. This capability may be activated after the computing device has been shipped to a user. This allows an entity to provide S3 DXE IPL code and the verification key infrastructure to third parties as small "hooks" in the EFI BIOS, but post-ship, a firmware volume can be added to the computing device for purposes of executing in the OS-suspended, S3 DXE environment.

The techniques described herein are not limited to any particular hardware or software configuration; they may find applicability in any computing, consumer electronics, or processing environment. The techniques may be implemented in hardware, software, or a combination of the two. The techniques may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, that may include a processor, a storage medium accessible by the processor (including volatile and non-volatile memory and/or storage elements), at least one input device, and one or more output devices. One of ordinary skill in the art may appreciate that the disclosure can be practiced with various system configurations, including multiprocessor systems, minicomputers, mainframe computers, independent consumer electronics devices, and the like. The invention can also be practiced in distributed computing environments where tasks or portions thereof may be performed by remote processing devices that are linked through a communications network.

Program instructions may be used to cause a general-purpose or special-purpose processing system that is programmed with the instructions to perform some the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "computer readable medium" used herein shall include any medium that is capable of storing or encoding a sequence of instructions for execution by a computing device and that cause the computing device to perform any one of the methods described herein. The term "computer readable medium" shall accordingly include, but not be limited to, solid-state memories, and optical and magnetic disks. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action or produce a result.

What is claimed is:

1. A method for provisioning a firmware module to a computing device, the method comprising:
    downloading a firmware volume including at least one firmware module to the computing device when the computing device is in a first, higher power consumption state, the firmware volume comprising a manifest declaring hardware resources of the computing device to be used during a second, lower power consumption state by the at least one firmware module;
    re-instantiating a firmware environment that includes one or more firmware functions available at pre-boot time, when transitioning the computing device from the first, higher power consumption state to the second, lower power consumption state;
    determining, by the firmware environment, whether a cryptographic signature on the firmware volume is verified;
    determining, by the firmware environment, whether the hardware resources of the computing device requested by the manifest of the firmware volume are available;
    determining, by the firmware environment, whether the at least one firmware module of the firmware volume is compatible with installed firmware of the firmware environment;
    reserving space in a memory to accommodate resources used by the at least one firmware module; and
    executing the at least one firmware module with the computing device in the second, lower power consumption state.

2. The method of claim 1, wherein the firmware volume comprises a header, a cryptographic signature covering the contents of the firmware volume, and the at least one firmware module.

3. The method of claim 2, where the at least one firmware module comprises binary code for one or more EFI S3 DXE IPL firmware drivers.

4. The method of claim 3, wherein the firmware environment comprises a S3 DXE IPL enable flag set to false at manufacturing time of the computing device, and further comprising setting the S3 DXE IPL enable flag to true when the cryptographic signature is verified, the hardware resources are available, and the at least one firmware module is compatible.

5. The method of claim 4, further comprising, upon a successive S3 resume, if the S3 DXE IPL enable flag is true, launching the S3 DXE IPL and associated firmware modules from the firmware volume prior to passing control to an operating system resume vector.

6. The method of claim 1, wherein the firmware volume is provided and signed by a party other than the manufacturer of the computing device, and the firmware volume is installed to the computing device after shipment to a user.

7. The method of claim 1, further comprising creating a system table entry with a status structure for returning a status value relating execution of the at least one firmware module to the operating system of the computing device.

8. A computing device comprising:
    a processor;
    a firmware environment configured to be operated by the processor;
    wherein the firmware environment includes a plurality of firmware functions employed to boot the apparatus into an operational state consuming a first power level;
    wherein the processor downloads a firmware volume including at least one firmware module to the computing device when the computing device is in the operational state, the firmware volume comprising a manifest declaring hardware resources of the computing device to be used, during a second power level lower than the first power level, by the at least one firmware module;
    wherein the firmware environment is further configured to be re-instantiated to include at least a subset of the firmware functions employed to boot the apparatus when the apparatus transitions from the operational state to a sleep state consuming the second power level, to enable the firmware environment to
    determine, by the firmware environment, whether a cryptographic signature on the firmware volume is verified;
    determine, by the firmware environment, whether the hardware resources of the computing device requested by the manifest of the firmware volume are available;
    determine, by the firmware environment, whether the at least one firmware module of the firmware volume is compatible with installed firmware of the firmware environment;
    reserve space in a memory to accommodate resources used by the at least one firmware module; and
    execute the at least one firmware module with the computing device in the second, lower power consumption state.

9. The computing device of claim 8, wherein the firmware volume comprises a header, a cryptographic signature covering the contents of the firmware volume, and the at least one firmware module.

10. The computing device of claim 9, wherein the at least one firmware module comprises binary code for one or more EFI S3 DXE IPL firmware drivers.

11. The computing device of claim 10, wherein the firmware environment comprises a S3 DXE IPL enable flag set to false at manufacturing time of the computing device, and wherein the firmware environment sets the S3 DXE IPL enable flag to true when the cryptographic signature is verified, the hardware resources are available, and the at least one firmware module is compatible.

12. The computing device of claim 11, wherein upon a successive S3 resume, if the S3 DXE IPL enable flag is true, the firmware environment launches the S3 DXE IPL and associated firmware modules from the firmware volume prior to passing control to an operating system resume vector.

13. The computing device of claim 8, wherein the firmware volume is provided and signed by a party other than the manufacturer of the computing device, and the firmware volume is installed to the computing device after shipment to a user.

14. The computing device of claim 8, wherein the firmware environment creates a system table entry with a status structure for returning a status value relating execution of the at least one firmware module to the operating system of the computing device.

15. A non-transitory, computer-readable medium comprising one or more instructions that when executed on a processor of a computing device perform one or more operations to provision a firmware module to the computing device by
- re-instantiating a firmware environment that includes one or more firmware functions available at pre-boot time, when transitioning the computing device from a first, higher power consumption state to a second, lower power consumption state;
- downloading a firmware volume including at least one firmware module to the computing device when the computing device is in the first, higher power consumption state, the firmware volume comprising a manifest declaring hardware resources of the computing device to be used during the second, lower power consumption state by the at least one firmware module;
- determining, by the firmware environment, whether a cryptographic signature on the firmware volume is verified;
- determining, by the firmware environment, whether the hardware resources of the computing device requested by the manifest of the firmware volume are available;
- determining, by the firmware environment, whether the at least one firmware module of the firmware volume is compatible with installed firmware of the firmware environment;
- reserving space in a memory to accommodate resources used by the at least one firmware module; and
- executing the at least one firmware module with the computing device in the second, lower power consumption state.

16. The computer-readable medium of claim 15, wherein the firmware volume comprises a header, a cryptographic signature covering the contents of the firmware volume, and the at least one firmware module.

17. The computer-readable medium of claim 16, where the at least one firmware module comprises binary code for one or more EFI S3 DXE IPL firmware drivers.

18. The computer-readable medium of claim 17, wherein the firmware environment comprises a S3 DXE IPL enable flag set to false at manufacturing time of the computing device, and further comprising instructions to set the S3 DXE IPL enable flag to true when the cryptographic signature is verified, the hardware resources are available, and the at least one firmware module is compatible.

19. The computer-readable medium of claim 18, further comprising instructions to, upon a successive S3 resume, if the S3 DXE IPL enable flag is true, launch the S3 DXE IPL and associated firmware modules from the firmware volume prior to passing control to an operating system resume vector.

20. The computer-readable medium of claim 15, further comprising instructions to create a system table entry with a status structure for returning a status value relating execution of the at least one firmware module to the operating system of the computing device.

* * * * *